United States Patent
Kimoto et al.

(10) Patent No.: US 9,058,847 B2
(45) Date of Patent: Jun. 16, 2015

(54) COMMUNICATION APPARATUS, CONTROL METHOD, AND COMPUTER-READABLE RECORDING MEDIUM

(71) Applicant: CANON KABUSHIKI KAISHA, Tokyo (JP)

(72) Inventors: Tatsuya Kimoto, Tokyo (JP); Hidetaka Koizumi, Kawasaki (JP); Koji Ogaki, Koza-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/285,798

(22) Filed: May 23, 2014

(65) Prior Publication Data

US 2014/0270694 A1 Sep. 18, 2014

Related U.S. Application Data

(63) Continuation of application No. 12/854,101, filed on Aug. 10, 2010, now Pat. No. 8,805,160.

(30) Foreign Application Priority Data

Aug. 17, 2009 (JP) .................. 2009-188602

(51) Int. Cl.
H04N 5/775 (2006.01)
G11B 31/00 (2006.01)
G06F 3/14 (2006.01)
G09G 5/00 (2006.01)
H04N 5/77 (2006.01)
H04N 5/907 (2006.01)
H04N 9/87 (2006.01)

(52) U.S. Cl.
CPC .............. *G11B 31/006* (2013.01); *G06F 3/14* (2013.01); *G09G 5/006* (2013.01); *G09G 2330/021* (2013.01); *G09G 2370/047* (2013.01); *G09G 2370/12* (2013.01); *H04N 5/772* (2013.01); *H04N 5/907* (2013.01); *H04N 9/87* (2013.01)

(58) Field of Classification Search
CPC ............. H04N 5/00; H04N 7/00; H04N 9/00; H04N 21/00
See application file for complete search history.

(56) References Cited

U.S. PATENT DOCUMENTS

2007/0057931 A1* 3/2007 Takamori ...................... 345/204

FOREIGN PATENT DOCUMENTS

JP 2005-109703 A 4/2005
JP 2009-171403 A 7/2009

OTHER PUBLICATIONS

"High-bandwidth Digital Content Protection System;" Digital Content Protection, LLC; Jun. 9, 2003; pp. 1-19.

* cited by examiner

*Primary Examiner* — Huy T Nguyen
(74) *Attorney, Agent, or Firm* — Canon USA, Inc. IP Division (57) ABSTRACT

A communication apparatus includes a communication unit that communicates with an external apparatus via communication lines conforming to HDMI standard, a first detection unit that determines whether a first signal is detected indicating that the communication unit and the external apparatus are connected, a second detection unit that determines whether a second signal is detected indicating that the external apparatus is in a state where the external apparatus displays video data transmitted from the communication unit, and a control unit that controls the communication unit to transmit the video data to the external apparatus if the first signal and the second signal are detected.

20 Claims, 3 Drawing Sheets

COMMUNICATION APPARATUS, CONTROL METHOD, AND COMPUTER-READABLE RECORDING MEDIUM

CROSS-REFERENCE TO RELATED APPLICATION

This application is a Continuation of U.S. application Ser. No. 12/854,101, filed Aug. 10, 2010, which claims priority from Japanese Patent Application No. 2009-188602 filed Aug. 17, 2009, which is hereby incorporated by reference herein in its entirety.

BACKGROUND OF THE INVENTION

1. Field of the Invention

The present invention relates to a communication apparatus that communicates with an external apparatus, a control method, and a computer-readable recording medium.

2. Description of the Related Art

At present, there are suggested communication systems which comply with the High Definition Multimedia Interface (HDMI, registered trademark) standard (hereinafter referred to as the "HDMI systems"). The HDMI system includes a source apparatus that transmits video data and audio data, and a sink apparatus that has a display apparatus to display video data received from the source apparatus.

In an HDMI system, a user can cause the sink apparatus to display video data reproduced from the source apparatus, and view desired video data.

Japanese Patent Application Laid-Open No. 2007-078980 discusses that, in the above HDMI system, the source apparatus acquires Extended display identification data (EDID) from the sink apparatus, according to a Hot Plug Detect (HPD) signal detected from the sink apparatus. Based on the acquired EDID, the source apparatus also transmits video data that the sink apparatus can output.

If video data received from the source apparatus is not compatible with the EDID description, the sink apparatus does not output (or display) video data received from the source apparatus, even after the sink apparatus receives video data from the source apparatus.

In such a case, even if the source apparatus continues to transmit video data to the sink apparatus, the source apparatus merely consumes extra power, as the sink apparatus does not display the video data transmitted from the source apparatus.

When an HPD signal is on, the sink apparatus outputs (displays) video data compatible with the description of the EDID received from the source apparatus, after transmitting the EDID to the source apparatus in response to an EDID request from the source apparatus.

Therefore, after the sink apparatus outputs (displays) video data received from the source apparatus, the source apparatus needs to acquire again the EDID of the sink apparatus so as to cause the sink apparatus to output video data received from the source apparatus, even if the source apparatus has already acquired the EDID from the sink apparatus.

In such a case, after acquiring again the EDID of the sink apparatus, the source apparatus analyzes the acquired EDID. The source apparatus then generates video data compatible with the description of the EDID of the sink apparatus, and transmits the video data to the sink apparatus. Therefore, there is a delay in outputting (displaying) the video data from the source apparatus by the sink apparatus.

SUMMARY OF THE INVENTION

According to an aspect of the present invention, there is provided a communication apparatus, comprising: a communication unit that communicates with an external apparatus via a plurality of communication lines conforming to High Definition Multimedia Interface (HDMI) standard; a first detection unit that determines whether a first signal is detected by the communication unit via a Hot Plug Detect (HPD) line, the first signal including a signal indicating that the communication unit and the external apparatus are connected; a second detection unit that determines whether a second signal is detected by the communication unit via a Transition Minimized Differential Signaling (TMDS) line, the second signal including a signal indicating that the external apparatus is in a state where the external apparatus displays video data received from the communication unit; and a control unit that controls the communication unit to transmit the video data to the external apparatus via the TMDS line if the first signal and the second signal are detected.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the attached drawings.

Figure 1:
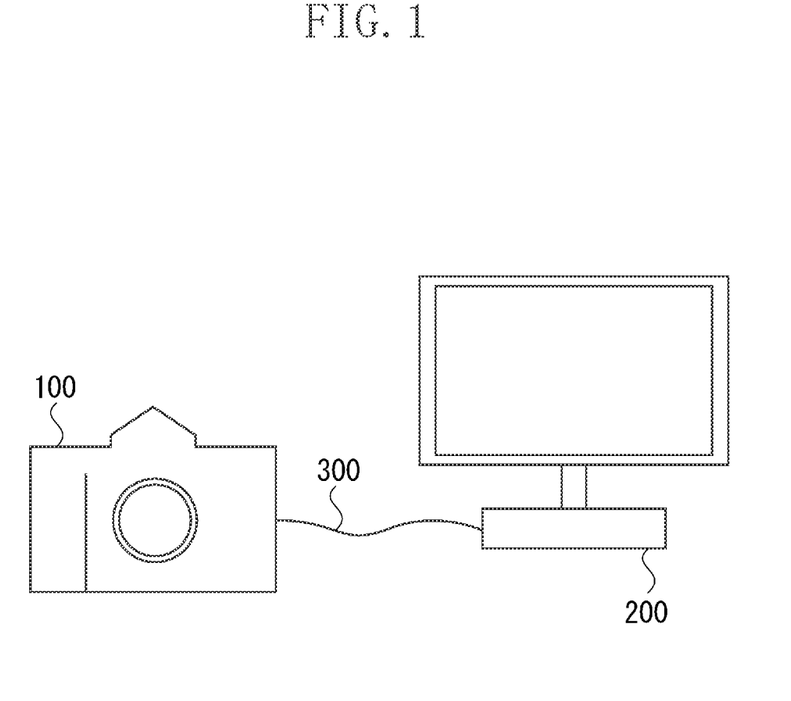
FIG. 1 illustrates an example of a communication system according to a first exemplary embodiment of the present invention.

A communication system according to a first exemplary embodiment of the present invention includes a communication apparatus 100, an external apparatus 200, and a connection cable 300, as illustrated in FIG. 1. The communication apparatus 100 and the external apparatus 200 are connected via the connection cable 300.

The communication apparatus 100 is an output apparatus that is capable of transmitting video data, audio data, and auxiliary data to the external apparatus 200 via the connection cable 300. The external apparatus 200 is a display apparatus that displays video data received from the communication apparatus 100 on a display device, and outputs audio data received from the communication apparatus 100 through a speaker. Each of the communication apparatus 100 and the external apparatus 200 is capable of bidirectionally transmitting various control commands via the connection cable 300.

In the first exemplary embodiment, the communication apparatus 100, the external apparatus 200, and the connection cable 300 conform to the HDMI standard. Accordingly, the communication apparatus 100 is a source apparatus that functions as an HDMI source according to the HDMI standard, and the external apparatus 200 is a sink apparatus that functions as an HDMI sink according to the HDMI standard.

In the first exemplary embodiment, the communication apparatus 100 and the external apparatus 200 conform to the Consumer Electronics Control (CEC) protocol set forth in the HDMI standard. The control commands to be transmitted bidirectionally between the communication apparatus 100 and the external apparatus 200 conform to the CEC protocol. Hereinafter, the control commands conform to the CEC protocol will be referred to as the "CEC commands".

In the first exemplary embodiment, a single-lens reflex camera (hereinafter referred to as a camera) is used as an example of the communication apparatus 100. The communication apparatus 100 is not limited to a single-lens reflex camera, and a video output apparatus such as a digital still camera, a digital video camera, a recorder, or a digital versatile disc (DVD) player may be used as the communication apparatus 100, as long as the apparatus has the function of an HDMI source apparatus.

In the first exemplary embodiment, a television receiver (hereinafter referred to as "TV") is used as an example of the external apparatus 200. The external apparatus 200 is not limited to a TV, and a display apparatus such as a projector or a personal computer may be used as the external apparatus 200, as long as the apparatus has the function of an HDMI sink apparatus.

Hereinafter, the communication apparatus 100 will be referred to as the "camera 100", the external apparatus 200 will be referred to as the "TV 200", and the connection cable 300 will be referred to as the "HDMI cable 300".

Figure 2:
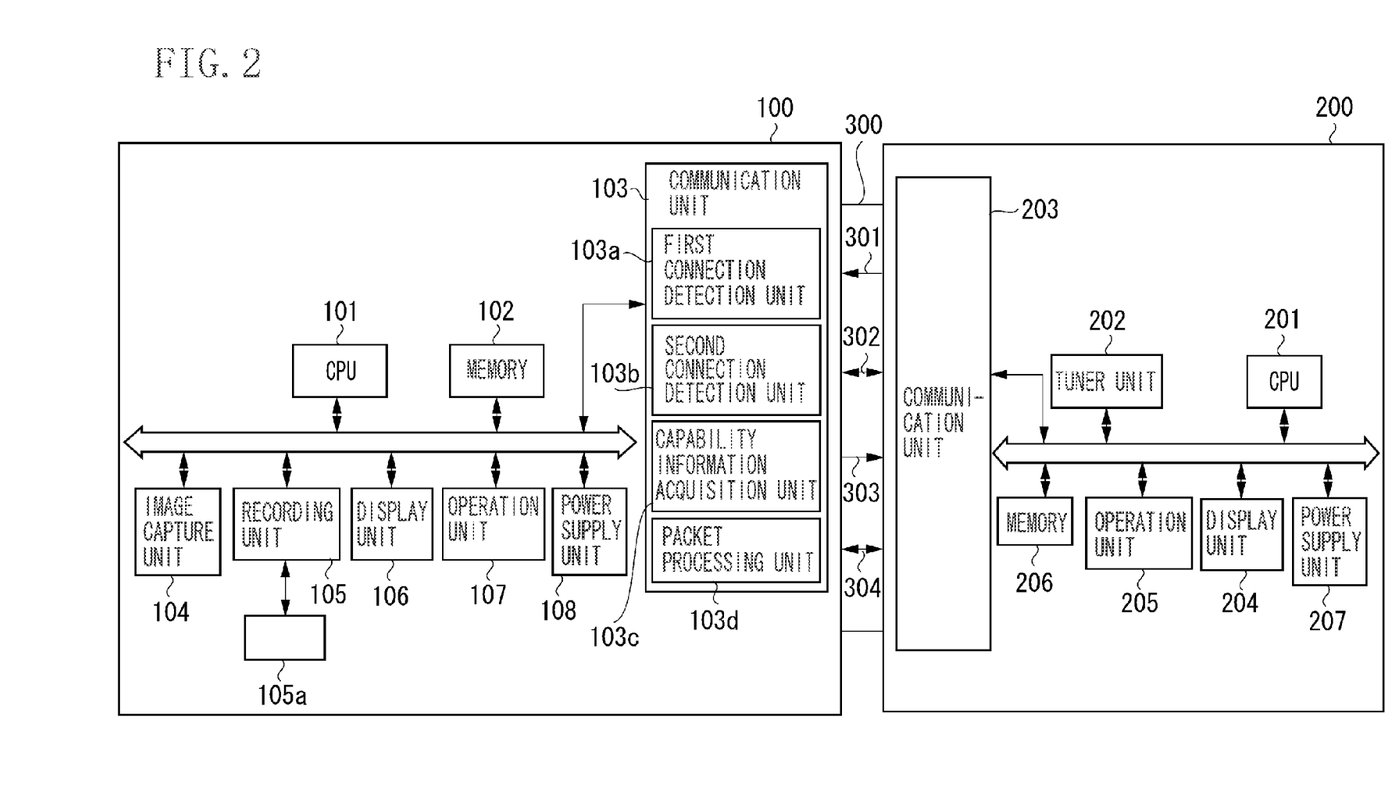
FIG. 2 is a block diagram illustrating a communication apparatus according to the first exemplary embodiment of the present invention.

Referring now to FIG. 2, the HDMI cable 300 is described.

The HDMI cable 300 includes a +5 V power line (not illustrated), a Hot Plug Detect (HPD) line 301, and a Display Data Channel (DDC) line 302. The HDMI cable 300 further includes a Transition Minimized Differential Signaling (TMDS) line 303, and a CEC line 304.

The +5 V power line is a power supply line for supplying +5 V power from the camera 100 to the TV 200.

The HPD line 301 is a transmission line for transmitting an HPD signal of a high-voltage level (hereinafter referred to as the H-level) or a low-voltage level (hereinafter referred to as the L-level) from the TV 200 to the camera 100.

If the camera 100 is supplying +5 V power to the TV 200 via the +5 V power line, the TV 200 determines whether the device information (capability information) about the TV 200 can be transmitted to the camera 100.

The device information about the TV 200 is Extended Display identification data (EDID) or Enhanced EDID (E-EDID) of the TV 200. The EDID and the E-EDID contain identification information about the TV 200, information about the display capability and audio capability of the TV 200, as the device information about the TV 200. For example, the EDID and the E-EDID contain information about the resolution, the scanning frequency, the aspect ratio, and the color space supported by the TV 200. The E-EDID is formed by enhancing the EDID, and contains more device information than the EDID does. For example, the E-EDID contains information about the formats of the video data and audio data supported by the TV 200. Hereinafter, the EDID and the E-EDID will be both referred to as the "EDID".

If the camera 100 is supplying +5 V power to the TV 200, and the TV 200 can transmit the EDID to the camera 100, the TV 200 transmits an HPD signal of the H-level to the camera 100 via the HPD line 301. By transmitting the HPD signal of the H-level to the camera 100, the TV 200 can notify the camera 100 that the camera 100 can acquire the EDID.

In some cases, the TV 200 cannot transmit the EDID of the TV 200 to the camera 100, although the camera 100 is supplying +5 V power to the TV 200. This might be because the video settings, resolution settings, and audio settings in the EDID of the TV 200 are changed, and the TV 200 rewrites the information contained in the EDID. In such a case, the TV 200 transmits an HPD signal of the L-level to the camera 100 via the HPD line 301 until completing the rewriting of the EDID. After completing the rewriting of the EDID, the TV 200 transmits an HPD signal of the H-level to the camera 100 via the HPD line 301. If the camera 100 is not supplying +5 V power to the TV 200, the TV 200 also transmits an HPD signal of the L-level to the camera 100.

The DDC line 302 is a transmission line for transmitting the EDID of the TV 200 from the TV 200 to the camera 100. Receiving the EDID of the TV 200, the camera 100 refers to the EDID of the TV 200, to automatically recognize the display capability, the audio capability, and the like of the TV 200. Further, a CPU 101 can automatically recognize the video format and the audio format compatible with the display capability and the audio capability of the TV 200. By changing the settings of the camera 100 to the settings compatible with the TV 200, the camera 100 can change the video data and the audio data transmitted from the camera 100 to the TV 200 to video data and audio data compatible with the capability of the TV 200.

The TMDS line 303 is a transmission line for transmitting video data, audio data, and auxiliary data from the camera 100 to the TV 200. The TMDS line 303 includes a TMDS channel 0, a TMDS channel 1, a TMDS channel 2, and a TMDS clock channel.

The CEC line 304 is a transmission line for transmitting various CEC commands bidirectionally between the camera 100 and the TV 200. The TV 200 can control the camera 100 by transmitting CEC commands for controlling the camera 100 to the camera 100 via the CEC line 304.

Referring now to FIG. 2, an example configuration of the camera 100 is described.

As illustrated in FIG. 2, the camera 100 includes the central processing unit (CPU) 101, a memory 102, a communication unit 103, an image capture unit 104, a recording unit 105, a display unit 106, an operation unit 107, and a power supply unit 108. The following is a description of the camera 100.

The CPU 101 controls the entire operations of the camera 100, according to a computer program stored in the memory 102. The CPU 101 can also control the entire operations of the camera 100, using the EDID of the TV 200. By analyzing data supplied from each component of the camera 100, the CPU 101 controls the entire camera 100. The CPU 101 also performs a control operation so that the power supply unit 108 supplies power to each component or stops supplying power.

The memory 102 functions as a work area for the CPU 101. The information stored in the memory 102 includes the EDID of the TV 200 and the results of an analysis performed on the EDID of the TV 200 by the CPU 101. Also, the flag settings for the operations of the respective components and the results of operations and analyses performed by the CPU 101 are recorded in the memory 102. The work area for the CPU 101 is not limited to the memory 102, and may be an external recording apparatus such as a hard disk device.

The communication unit 103 includes a connection terminal for connecting the HDMI cable 300. The communication unit 103 acquires the EDID of the TV 200 via the connection terminal, and transmits and receives CEC commands. The communication unit 103 also transmits video data, audio data, and auxiliary data. The communication unit 103 further generates a 5 V voltage from the power supplied from the power supply unit 108, and supplies the 5 V voltage to the TV 200 via the +5 V power line. The communication unit 103 includes a first connection detection unit 103a, a second connection detection unit 103b, a capability information acquisition unit 103c, and a packet processing unit 103d.

The first connection detection unit 103a can receive an HPD signal of the H-level or an HPD signal of the L-level transmitted from the TV 200 via the HPD line 301. When the CPU 101 issues a request for the received HPD signal, the first connection detection unit 103a supplies the HPD signal to the CPU 101.

To detect the existence of the TV 200, the second connection detection unit 103b can determine, via the TMDS line 303, whether the TMDS line 303 is connected to a terminal resistor on the side of the TV 200. An example of information to be used to determine whether the TMDS line 303 is connected to the terminal resistor on the side of the TV 200 is information called "Receiver Sense (hereinafter referred to as the "RX sense"). The RX sense includes Rx sense of the H-level indicating that the TMDS line 303 is connected to the terminal resistor on the side of the TV 200, and RX sense of the L-level indicating that the TMDS line 303 is not connected to the terminal resistor on the side of the TV 200. When the TMDS line 303 is connected to the terminal resistor on the side of the TV 200, the second connection detection unit 103b detects the RX sense of the H-level. When the TMDS line 303 is not connected to the terminal resistor on the side of the TV 200, the second connection detection unit 103b detects the RX sense of the L-level.

When the TMDS line 303 is connected to the terminal resistor on the side of the TV 200, the TV 200 is in an output state. The output state is a power ON state, and is a state in which video data received from the camera 100 via the TMDS line 303 is selected as the video data to be displayed by the TV 200. Accordingly, when the second connection detection unit 103b detects the RX sense of the H-level, the CPU 101 determines that the TV 200 is in the video image output state.

When the TMDS line 303 is not connected to the terminal resistor on the side of the TV 200, the TV 200 is in a non-output state. The non-output state is a state that does not satisfy at least one of the following states: where the TV 200 is in the power ON state, and where video data received from the camera 100 via the TMDS line 303 is selected as the video data to be displayed by the TV 200. Accordingly, when the second connection detection unit 103b detects the RX sense of the L-level, the CPU 101 determines that the TV 200 is in the non-output state.

In response to a request from the CPU 101, the second connection detection unit 103b supplies the detected RX sense to the CPU 101. According to the RX sense supplied from the second connection detection unit 103b, the CPU 101 determines whether the TV 200 can display the video data that is output from the camera 100, or whether the state of the TV 200 is the output state.

The capability information acquisition unit 103c can acquire the EDID from the TV 200 via the DDC line 302. When the HPD signal supplied from the first connection detection unit 103a to the CPU 101 is the H-level, the capability information acquisition unit 103c can acquire the EDID of the TV 200 from the TV 200 via the DDC line 302. When the HPD signal supplied from the first connection detection unit 103a to the CPU 101 is the L-level, the capability information acquisition unit 103c cannot acquire the EDID from the TV 200 via the DDC line 302. When acquiring the EDID, the capability information acquisition unit 103c supplies the acquired EDID to the CPU 101. The CPU 101 analyzes the supplied EDID, and records the supplied EDID and the results of the EDID analysis in the memory 102.

The packet processing unit 103d can transmit video data, audio data, and auxiliary data to the TV 200 via the TMDS line 303. When the operation mode of the camera 100 is an image capture mode, the packet processing unit 103d can transmit video data generated by the image capture unit 104 and audio data generated by a microphone unit (not illustrated) to the TV 200 via the TMDS line 303. In this case, auxiliary data generated by the CPU 101 is also transmitted, together with the video data and the audio data, to the TV 200 via the TMDS line 303. When the operation mode of the camera 100 is a playback mode, the packet processing unit 103d can transmit video data and audio data reproduced from a recording medium 105a by the recording unit 105, and auxiliary data generated by the CPU 101, to the TV 200 via the TMDS line 303. Alternatively, the packet processing unit 103d may transmit video data and audio data separately from each other.

Also, the necessary power for transmitting video data, audio data, and auxiliary data to the TV 200 is supplied to the packet processing unit 103d from the power supply unit 108 under the control of the CPU 101. When the HDMI cable 300 is inserted to a connection terminal of the camera 100 and a connection terminal of the TV 200, the CPU 101 controls the power supply unit 108 to supply power to the packet processing unit 103d, to cause the packet processing unit 103d to change from a low power consumption state to a normal state. The normal state in the packet processing unit 103d is a state where the power supply unit 108 is supplying the packet processing unit 103d with the power necessary for the packet processing unit 103d to transmit video data, audio data, and auxiliary data to the TV 200. The low power consumption state in the packet processing unit 103d is a state where the power supply unit 108 does not supply the packet processing unit 103d with the power necessary for the packet processing unit 103d to transmit video data, audio data, and auxiliary data to the TV 200.

After changing to the normal state, the packet processing unit 103d is enabled, and becomes able to transmit video data, audio data, and auxiliary data to the TV 200 via the TMDS line 303. The CPU 101 controls the power supply unit 108 to stop supplying power to the packet processing unit 103d, to cause the packet processing unit 103d to change from the normal state to the low power consumption state. When the HDMI cable 300 is disconnected from the connection terminal of the camera 100 and the connection terminal of the TV 200, the CPU 101 also controls the power supply unit 108 to cause the packet processing unit 103d to change from the normal state to the low power consumption state. In this case, the packet processing unit 103d is disabled, and becomes unable to transmit video data, audio data, and auxiliary data to the TV 200 via the TMDS line 303.

When the operation mode of the camera 100 is an image capture mode, the image capture unit 104 captures an image of an object, and generates video data from an optical image of the object. The video data generated by the image capture unit 104 may be either a moving image or a still image. The video data generated by the image capture unit 104 is supplied from the image capture unit 104 to the packet processing unit 103d, the recording unit 105, and the display unit 106. If the EDID has been successfully received from the TV 200, the image capture unit 104 converts the video data to be supplied from the image capture unit 104 to the packet processing unit 103d, into video data compatible with the display capability of the TV 200. The video data supplied from the image capture unit 104 to the packet processing unit 103d is transmitted to the TV 200 via the TMDS line 303. The video data supplied from the image capture unit 104 to the recording unit 105 is recorded in the recording medium 105a. The display unit 106 displays the video data supplied from the image capture unit 104 to the display unit 106.

When the image capture unit 104 generates video data, the microphone unit (not illustrated) generates audio data. The audio data generated by the microphone unit is supplied from the microphone unit to the packet processing unit 103*d*, the recording unit 105, and a speaker unit (not illustrated). If the EDID has been successfully received from the TV 200, the microphone unit converts the audio data to be supplied from the microphone unit to the packet processing unit 103*d*, into audio data compatible with the audio capability of the TV 200. The audio data supplied from the microphone unit to the packet processing unit 103 is transmitted to the TV 200 via the TMDS line 303. The audio data supplied from the microphone unit to the recording unit 105 is recorded in the recording medium 105*a*. The speaker unit (not illustrated) outputs the audio data supplied from the microphone unit to the display unit 106.

When the operation mode of the camera 100 is a playback mode, the image capture unit 104 stops capturing an image of an object, and stops generating video data from an optical image of the object.

When the operation mode of the camera 100 is the image capture mode, the recording unit 105 can record the video data generated by the image capture unit 104 and the audio data generated by the microphone unit in the recording medium 105*a*. The CPU 101 controls the recording of the video data and the audio data generated by the image capture unit 104 and the microphone unit in the recording medium 105*a*, according to an instruction that is input from a user via the operation unit 107.

When the operation mode of the camera 100 is the playback mode, the recording unit 105 can reproduce the video data and audio data selected by a user from the recording medium 105*a*. The CPU 101 controls the selection of the video data and the audio data reproduced from the recording medium 105*a*, according to an instruction that is input from a user via the operation unit 107.

The video data reproduced from the recording medium 105*a* by the recording unit 105 is supplied from the recording unit 105 to the packet processing unit 103*d* and the display unit 106. If the capability information acquisition unit 103*c* has successfully received the EDID from the TV 200, the recording unit 105 converts the video data to be supplied from the recording unit 105 to the packet processing unit 103*d*, into video data compatible with the display capability of the TV 200 according to the EDID. The video data supplied from the recording unit 105 to the packet processing unit 103*d* is transmitted to the TV 200 via the TMDS line 303. The display unit 106 displays the video data supplied from the recording unit 105 to the display unit 106. The audio data reproduced from the recording medium 105*a* by the recording unit 105 is supplied from the recording unit 105 to the packet processing unit 103*d* and the speaker unit (not illustrated). If the capability information acquisition unit 103*c* has successfully received the EDID from the TV 200, the recording unit 105 converts the audio data to be supplied from the recording unit 105 to the packet processing unit 103*d*, into audio data compatible with the audio capability of the TV 200 according to the EDID. The audio data supplied from the recording unit 105 to the packet processing unit 103*d* is transmitted to the TV 200 via the TMDS line 303. The speaker unit outputs the audio data supplied from the recording unit 105 to the speaker unit.

The recording medium 105*a* is a recording medium such as a memory card or a hard disk device. The recording medium 105*a* may be either a recording medium provided in the camera 100 or a recording medium detachable from the camera 100.

The display unit 106 includes a display device such as a liquid crystal display. When the operation mode of the camera 100 is the image capture mode, the display unit 106 displays the video data generated by the image capture unit 104. When the operation mode of the camera 100 is the playback mode, the display unit 106 displays the video data reproduced from the recording medium 105*a* by the recording unit 105.

The operation unit 107 provides a user interface for operating the camera 100. The operation unit 107 includes buttons for operating the camera 100. The buttons in the operation unit 107 include switches and touch panels. The CPU 101 can control the camera 100, according to an instruction that is input from a user via the operation unit 107.

The power supply unit 108 supplies necessary power to a battery or an AC power supply detachable from the camera 100, and to the respective components of the camera 100. A power OFF state is a state where the power supply unit 108 has partially or entirely stopped supplying power to the camera 100. A power ON state is a state where the power supply unit 108 is supplying power partially or entirely to the camera 100.

Referring now to FIG. 2, an example configuration of the TV 200 is described.

The TV 200 includes a CPU 201, a tuner unit 202, a communication unit 203, a display unit 204, an operation unit 205, a memory 206, and a power supply unit 207, as illustrated in FIG. 2.

The CPU 201 controls the operation of the entire TV 200, according to a computer program stored in the memory 206. The CPU 201 also controls the power supply unit 207 to supply power to the respective components or stop supplying power.

The tuner unit 202 receives television broadcasts on a television channel selected by a user. A television channel is selected with the use of the operation unit 205 or a remote controller (not illustrated). The CPU 201 controls the tuner unit 202, according to an instruction that is input from a user via the operation unit 205. Accordingly, the tuner unit 202 can receive the television broadcasts on the television channel selected by a user using the remote controller (not illustrated) or the operation unit 205. The display unit 204 displays the video data contained in the television broadcasts received by the tuner unit 202. The speaker unit (not illustrated) outputs the audio data contained in the television broadcasts received by the tuner unit 202. The auxiliary data contained in the television broadcasts received by the tuner unit 202 is supplied to the CPU 201. The CPU 201 can control the TV 200, according to the auxiliary data received from the camera 100.

The communication unit 203 includes connection terminals that connect to the HDMI cable 300. The communication unit 203 can receive, via the TMDS line 303, video data, audio data, and auxiliary data transmitted from the camera 100. The display unit 204 displays the video data received from the camera 100. The speaker unit (not illustrated) outputs the audio data received from the camera 100. The auxiliary data received from the camera 100 is supplied to the CPU 201. The CPU 201 can control the TV 200, according to the auxiliary data received from the camera 100.

The number of connection terminals included in the communication unit 203 varies among TVs 200. Each TV 200 can connect to source apparatuses excluding the camera 100 via the same number of HDMI cables as the number of connection terminals. Accordingly, the TV 200 can receive video data, audio data, and auxiliary data transmitted from source apparatuses that are connected to the TV 200 and exclude the camera 100. In this case, the display unit 204 displays the video data received from the source apparatuses excluding the camera 100, the speaker unit (not illustrated) outputs the audio data, and the auxiliary data is supplied to the CPU 201. The communication unit 203 can receive CEC commands transmitted from the camera 100 via the CEC line 304, and transmits CEC commands generated by the CPU 201 to the camera 100.

The communication unit 203 determines whether the camera 100 is supplying +5 V to the TV 200 via the +5 V power line, and, based on the determination result, transmits an HPD signal of the H-level or an HPD signal of the L-level to the camera 100 via the HPD line 301. When the communication unit 203 is not receiving the +5 V power from the camera 100 via the +5 V power line, the CPU 101 controls the communication unit 203 to transmit an HPD signal of the L-level to the camera 100 via the HPD line 301.

When the communication unit 203 is receiving the +5 V power from the camera 100 via the +5 V power line, the CPU 201 determines whether the EDID of the TV 200 stored in the memory 206 can be transmitted to the camera 100 via the DDC line 302. If the information contained in the EDID stored in the memory 206 has not been changed, or if rewriting of the EDID has been completed, the CPU 201 determines that the EDID of the TV 200 can be transmitted to the camera 100 via the DDC line 302. In this case, the CPU 201 controls the communication unit 203 to transmit an HPD signal of the H-level to the camera 100 via the HPD line 301. If the information contained in the EDID has been rewritten by changing the settings for the TV 200, the CPU 201 determines that the EDID of the TV 200 cannot be transmitted to the camera 100 via the DDC line 302. In this case, the CPU 201 also controls the communication unit 203 to transmit an HPD signal of the L-level to the camera 100 via the HPD line 301.

The communication unit 203 can also transmit the EDID of the TV 200 to the camera 100 via the DDC line 302.

The display unit 204 includes a display device such as a liquid crystal display. The display unit 204 can display video data that is supplied from at least one of the tuner unit 202 and the communication unit 203. When the communication unit 203 supplies video data received from the camera 100, the display unit 204 displays the video data received from the camera 100.

The operation unit 205 provides a user interface for operating the TV 200. The operation unit 205 includes buttons for operating the TV 200. The buttons of the operation unit 205 are formed with stitches, touch panels, and the like. The CPU 201 can control the TV 200, according to an instruction that is input from a user via the operation unit 205. The operation unit 205 includes a power button, channel selection buttons, an external input button, and the like for operating the TV 200.

The power button is a button for instructing the CPU 201 to change the TV 200 from the power ON state or the power OFF state. The power NO state is a state where the CPU 201 controls the power supply unit 207 to supply the necessary power to all the components of the TV 200. The power OFF state is a state where the CPU 201 controls the power supply unit 207 to stop supplying power to part of the TV 200 or to all the components of the TV 200.

The channel selection buttons are buttons for selecting a television channel the tuner unit 202 is to receive.

The external input button is a button for selecting the video data contained in television broadcasts received by the tuner unit 202 or the video data received by the connected camera 100 via the HDMI cable 300, and causing the display unit 204 to display the selected video data.

The power supply unit 207 supplies the necessary power to the respective components of the TV 200 from an AC power supply or the like.

Figure 3:
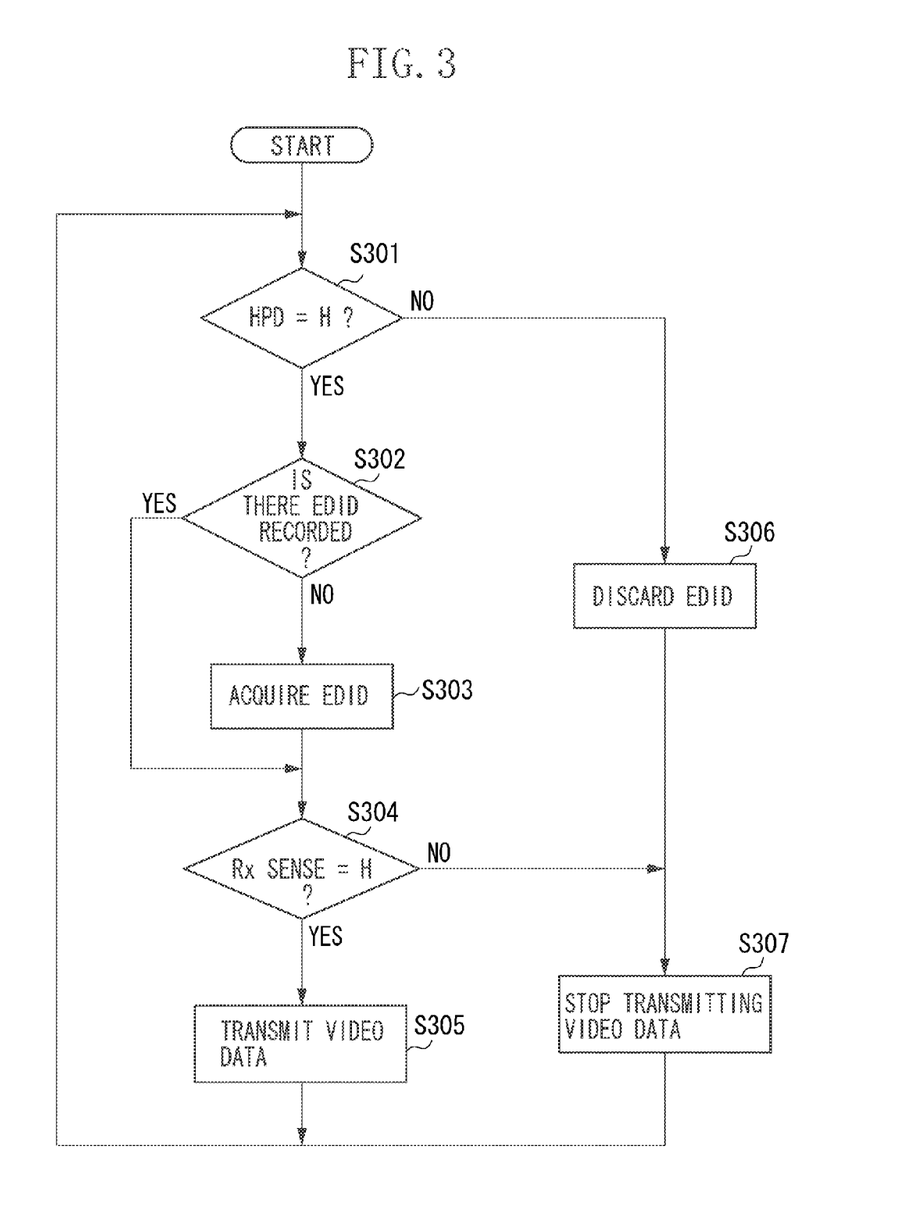
FIG. 3 is a flowchart illustrating image output control processing performed by the communication apparatus according to the first exemplary embodiment of the present invention.

Referring now to FIG. 3, a video output control process to be performed by the camera 100 according to the first exemplary embodiment is described.

FIG. 3 is a flowchart illustrating an example of the video output control process performed by the camera 100 according to the first exemplary embodiment. The video output control process is performed where the HDMI cable 300 is inserted to a connection terminal of the camera 100 and a connection terminal of the TV 200. The video output control process is performed while the camera 100 is supplying a 5 V voltage to the TV 200 via the +5 V power line. The CPU 101 executes a computer program stored in the memory 102, to control the video output control process. Alternatively, the computer program for causing the camera 100 to perform the procedures of the video output control process illustrated in FIG. 3 may be realized by utilizing the operating system (OS) operating on the computer.

When the HDMI cable 300 is inserted to a connection terminal of the camera 100 and a connection terminal of the TV 200, the CPU 101 requests the first connection detection unit 103a to supply an HPD signal. Depending on whether the HPD signal supplied from the first connection detection unit 103 is an HPD signal of the H-level or an HPD signal of the L-level, the CPU 101 determines whether the EDID of the TV 200 can be acquired from the TV 200 via the DDC line 302.

When the first connection detection unit 103a supplies an HPD signal of the H level, the CPU 101 determines whether the EDID can be acquired via the DDC line 302 (YES in step S301). The process proceeds from step S301 to step S302. When the first connection detection unit 103a supplies an HPD signal of the L-level, the CPU 101 determines that the EDID cannot be acquired via the DDC line 302 (NO in step S301). The process proceeds from step S301 to step S306. If the first connection detection unit 103a supplies an HPD signal of the L-level, the TV 200 might have rewritten the information contained in the EDID of the TV 200. Also, when the HDMI cable 300 is disconnected from the connection terminal of the camera 100 and the connection terminal of the TV 200, the first connection detection unit 103a supplies an HPD signal of the L-level.

When an HPD signal of the H-level is supplied (YES in step S301), the CPU 101 needs to determine whether the camera 100 has acquired the EDID of the TV 200 from the TV 200 via the DDC line 302. Therefore, in step S302, the CPU 101 determines whether the EDID of the TV 200 is recorded in the memory 102.

If the CPU 101 determines that the EDID acquired from the TV 200 via the DDC line 302 is already recorded in the memory 102 (YES in step S302), the process proceeds from step S302 to step S304.

If the CPU 101 determines that the EDID of the TV 200 is not recorded in the memory 102 (NO in step S302), the process proceeds from step S302 to step S303.

If the CPU 101 determines that the EDID of the TV 200 is not recorded in the memory 102 (NO in step S302), the camera 100 cannot transmit video data that is compatible with the display capability of the TV 200 before acquiring the EDID of the TV 200. Therefore, in step S303, the capability information acquisition unit 103c acquires the EDID from the TV 200 via the DDC line 302, and supplies the acquired EDID of the TV 200 to the CPU 101. The CPU 101 analyzes the EDID supplied from the capability information acquisition unit 103c, and records the results of the EDID analysis and the EDID in the memory 102. After the CPU 101 records the results of the EDID analysis and the EDID in the memory 102, the process proceeds from step S303 to step S304.

If the EDID acquired from the TV 200 is already recorded in the memory 102 (YES in step S302), the CPU 101 can transmit video data to the TV 200, according to the EDID in the memory 102.

When the capability information acquisition unit 103c acquires the EDID from the TV 200 in step S303, the CPU 101 can transmit video data to the TV 200, according to the EDID acquired in step S303.

In such a case, if the TV 200 is not in the output state, the video data received from the camera 100 cannot be displayed, even though the camera 100 has transmitted the video data to the TV 200 according to the EDID. As a result, the user not only is unable to view the video data transmitted from the camera 100 on the TV 200, but also consumes extra power from the camera 100. Therefore, the CPU 101 needs to determine whether the TV 200 is in the output state, before video data converted into a video format included in the EDID is transmitted to the TV 200.

In step S304, the CPU 101 requests the second connection detection unit 103b to supply the RX sense of the TV 200, and, based on the RX sense supplied from the second connection detection unit 103b, the CPU 101 determines whether the TV 200 is in the output state. The CPU 101 stores the RX sense supplied from the second connection detection unit 103b into the memory 102. When the second connection detection unit 103b supplies the RX sense of the H-level, the CPU 101 determines that the TV 200 is in the output state (YES in step S304). The process proceeds from step S304 to step S305. When the second connection detection unit 103b supplies the RX sense of the L-level, the CPU 101 determines that the TV 200 is in the non-output state. When the CPU 101 determines that the TV 200 is in the non-output state (NO in step S304), the process proceeds from step S304 to step S307.

If the camera 100 transmits video data to the TV 200 while the TV 200 is in the output state (YES in step S304), the TV 200 can display the video data received from the camera 100. In step S305, the CPU 101 performs a video output process. The video output process includes format conversion process and data transmission process of transmitting video data to the TV 200. The format conversion process is a process of converting the format of the video data to be supplied to the packet processing unit 103d to transmit the video data to the TV 200, into a video format that can be displayed on the TV 200, according to the results of the EDID analysis stored in the memory 102. Further, in the format conversion process, the format of the audio data to be transmitted to the TV 200 is converted to an audio format that can be output as sound from the TV 200, according to the results of the EDID analysis stored in the memory 102.

If the EDID acquired from the TV 200 is already recorded in the memory 102 (YES in step S302), the CPU 101 converts the video data to be transmitted to the TV 200, into a video format included in the EDID in the memory 102.

When the capability information acquisition unit 103c acquires the EDID from the TV 200 in step S303, the CPU 101 converts the video data to be transmitted to the TV 200, into a video format included in the EDID acquired in step S303.

When the format conversion process has already been performed, the format conversion process may be skipped.

The data transmission process is performed by the packet processing unit 103d to transmit video data and audio data converted into predetermined formats in the format conversion processing to the TV 200 via the TMDS line 303. If the packet processing unit 103d is in the low power consumption state, the data transmission process may include process of controlling the power supply unit 108 to return the packet processing unit 103d from the low power consumption state to the normal state. After the CPU 101 performs the process to transmit video data to the TV 200, the process returns from step S305 to step S301.

If an HPD signal of the L-level is supplied (NO in step S301), the CPU 101 cannot acquire the EDID from the TV 200 via the DDC line 302 until an HPD signal of the H-level is supplied. When the TV 200 supplies an HPD signal of the L-level to the camera 100, there is a possibility that the TV 200 has rewritten the information contained in the EDID of the TV 200. When the HPD signal of the H-level is again supplied after the HPD signal of the L-level is supplied, there is a possibility that the apparatus supplying the HPD signal of the H-level is a sink apparatus other than the TV 200. Here, the EDID might be transmitted from the new sink apparatus. In such a case, if the EDID and the results of the EDID analysis performed by the CPU 101 are recorded in the memory 102, there is a possibility that those pieces of information are not the correct EDID of the sink apparatus connected via an HDMI cable and the correct results of an analysis performed on the EDID. Therefore, in step S306, the CPU 101 discards the EDID and the results of the EDID analysis recorded in the memory 102.

After the CPU 101 discards the EDID and the results of the EDID analysis recorded in the memory 102, the process proceeds from step S306 to step S307. Although the CPU 101 discards the EDID and the results of the EDID analysis recorded in the memory 102, the process is not limited to that in step S306. For example, an invalid flag indicating that the EDID and the results of the EDID analysis recorded in the memory 102 are invalid may be set, and, at the time of transmission of video data, the CPU 101 may perform a control operation not to use the EDID and the results of the EDID analysis for which the invalid flag is set.

If the TV 200 is in the non-output state (NO in step S304), the TV 200 cannot display video data transmitted from the camera 100 until the user changes the TV 200 to the output state. In such a case, the TV 200 cannot display video data received from the camera 100, even if the CPU 101 controls the packet processing unit 103d to transmit the video data to the TV 200. As a result, extra power is consumed in the packet processing unit 103d.

If the EDID and the results of the EDID analysis are discarded in step S306, it is not possible to acquire the EDID from the TV 200 via the DDC line 302 until an HPD signal of the H-level is supplied to the CPU 101. Therefore, video data is not transmitted to the TV 200 via the TMDS line 303, since the CPU 101 cannot convert the video data to be supplied to the packet processing unit 103d into a video format that can be displayed on the TV 200. Even if the CPU 101 continues to control the power supply unit 108 to supply the packet processing unit 103d with the necessary power to transmit video data, video data is not transmitted to the TV 200. As a result, the packet processing unit 103d continues to consume extra power.

Therefore, in step S307, the CPU 101 stops the packet processing unit 103d from transmitting video data, and performs a process of changing the packet processing unit 103d into the low power consumption state. The processing of changing the packet processing unit 103d into the low power consumption state is a process of stopping supplying power from the power supply unit 108 to the packet processing unit 103d. When the packet processing unit 103d is in the low power consumption state, the first connection detection unit 103a, the second connection detection unit 103b, and the capability information acquisition unit 103c are in the normal state. Therefore, the first connection detection unit 103a detects HPD signals, the second connection detection unit 103b detects the RX sense, and the capability information acquisition unit 103c can acquire the EDID when the first connection detection unit 103a detects an HPD signal of the H-level. After the CPU 101 performs the process to change the packet processing unit 103d into the low power consumption state, the process returns from step S307 to step S301.

As described above, in the first exemplary embodiment, when the first connection detection unit 103a supplies an HPD signal of the L-level (NO in step S301), the camera 100 stops supplying power to the packet processing unit 103d. Since the camera 100 cannot transmit video data converted into a video format to be displayed on the TV 200 to the TV 200, a control operation is successfully performed not to transmit video data. In such a case, the camera 100 performs the control operation to stop the packet processing unit 103d from transmitting video data. Accordingly, the process executed by the camera 100 to transmit video data to an external apparatus is reduced, and the power consumption for the packet processing unit 103d can be reduced. In this manner, the power consumption in the entire camera 100 can be reduced.

When the TV 200 is determined to be in the non-output state based on the RX sense of the TV 200 supplied from the second connection detection unit 103b (NO in step S304), the camera 100 stops supplying power to the packet processing unit 103d. By doing so, the camera 100 can perform a control operation so that the TV 200 in the power OFF state or the TV 200 outputting video data and audio data supplied from another apparatus stops transmitting video data. Accordingly, the power consumption in the entire camera 100 can be reduced.

When the EDID acquired from the TV 200 is recorded in the memory 102 (YES in step S302), the camera 100 does not acquire the EDID again, and does not analyze the acquired EDID. With this arrangement, the camera 100 does not need to perform the EDID acquisition process. Accordingly, when the TV 200 is in the output state (YES in step S304), for example, the time required for the camera 100 to transmit video data to the TV 200 can be shortened.

When the first connection detection unit 103a supplies an HPD signal of the H-level (YES in step S301), the camera 100 keeps storing the EDID acquired once from the TV 200, even if the TV 200 is in the non-output state. Accordingly, when the TV 200 is changed into to the output state (YES in step S304), it is unnecessary to reacquire the EDID from the TV 200, and the time required for the camera 100 to transmit video data to the TV 200 can be shortened.

As described above, in the camera 100 according to the first exemplary embodiment, video data and audio data transmission by the camera 100 can be controlled, depending on whether the TV camera 200 is in the output state where video data transmitted from the camera 100 to the TV 200 can be displayed. Further, once the camera 100 acquires the EDID from the TV 200, the camera 100 according to the first exemplary embodiment stores the acquired EDID, unless the EDID is rewritten or the HDMI cable 300 is disconnected. Accordingly, it is not necessary to reacquire the EDID from the TV 200, and video data can be transmitted to the TV 200.

With the above arrangement, the power consumption in the camera 100 can be reduced according to the state of the TV 200, and the power consumption in the entire camera 100 can be reduced. Also, the time required for the camera 100 to transmit video data can be shortened.

The camera 100 and the TV 200 according to the first exemplary embodiment may be apparatuses not conforming to the CEC protocol.

In the first exemplary embodiment, a check is made to determine whether the terminal resistor on the side of the TV 200 is connected to the TMDS line 303, based on the RX sense. However, based on information other than the RX sense, a check may be made to determine whether the terminal resistor on the side of the TV 200 is connected to the TMDS line 303.

In the first exemplary embodiment, the communication apparatus 100 has been described as a source apparatus that conforms to the HDMI standard, and the external apparatus 200 has been described as a sink apparatus that conforms to the HDMI standard. However, they are not limited to the above apparatuses, as long as the video output control process according to the first exemplary embodiment can be performed.

The communication apparatus according to an exemplary embodiment of the present invention is not limited to the communication apparatus 100 according to the first exemplary embodiment, and may be realized by a system including more than one apparatuses, for example.

In the first exemplary embodiment, a computer program for causing the camera 100 to perform the procedures in the flowchart illustrating the above described video output control process is read from a computer readable recording medium, and is executed by a computer. The computer readable recording medium may be a hard disk device, an optical disk, a compact disc read only memory (CD-ROM), a CD recordable (CD-R), a memory card, a ROM, or the like. Also, a computer program according to the present invention may be supplied from an external apparatus to a computer via a communication interface, and may be executed by the computer.

While the present invention has been described with reference to exemplary embodiments, it is to be understood that the present invention is not limited to the disclosed exemplary embodiments. The scope of the following claims is to be accorded the broadest interpretation so as to encompass all modifications, and equivalent structures and functions.

What is claimed is:

1. A transmission device comprising:
    a first detection unit that detects, using a signal which is outputted from a display device, whether the transmission device and the display device are connected;
    a transmission unit that transmits image data to the display device;
    a second detection unit that detects whether the display device is in a first state, wherein the first state is a state where the display device is turned on and a state where image data to be transmitted from the transmission unit to the display device is selected as image data to be displayed by the display device; and
    a control unit that (a) controls, based on a detection result of the first detection unit and a detection result of the second detection unit, whether the transmission unit transmits image data to the display device, and (b) causes the transmission unit not to transmit image data to the display device if the transmission device and the display device are connected and the display device is in a second state that is different from the first state.

2. The transmission device according to claim 1, wherein the control unit causes the transmission unit not to transmit image data to the display device if the display device is changed to the second state after a transmission of image data to the display device is started.

3. The transmission device according to claim 1, wherein the control unit causes the transmission unit not to transmit image data to the display device if a connection between the transmission device and the display device is disconnected after a transmission of image data to the display device is started.

4. The transmission device according to claim 1, wherein the transmission device includes at least one of a camera, a recorder, and a player.

5. A method comprising:
  detecting, using a signal which is outputted from a display device, whether a transmission device and the display device are connected;
  detecting whether the display device is in a first state, wherein the first state is a state where the display device is turned on- and a state where image data to be transmitted to the display device is selected as image data to be displayed by the display device;
  controlling, based on a result of whether the transmission device and the display device are connected and a result of whether the display device is in the first state, a transmission of image data to the display device; and
  causing not to transmit image data to the display device if the transmission device and the display device are connected and the display device is in a second state that is different from the first state.

6. The method according to claim 5, further comprising causing not to transmit image data to the display device if the display device is changed to the second state after a transmission of image data to the display device is started.

7. The method according to claim 5, further comprising causing not to transmit image data to the display device if a connection between the transmission device and the display device is disconnected after a transmission of image data to the display device is started.

8. A non-transitory computer readable recording medium storing a program that causes a computer to perform a method, the method comprising:
  detecting, using a signal which is outputted from a display device, whether a transmission device and the display device are connected;
  detecting whether the display device is in a first state, wherein the first state is a state where the display device is turned on and a state where image data to be transmitted to the display device is selected as image data to be displayed by the display device;
  controlling, based on a result of whether the transmission device and the display device are connected and a result of whether the display device is in the first state, a transmission of image data to the display device; and
  causing not to transmit image data to the display device if the transmission device and the display device are connected and the display device is in a second state that is different from the first state.

9. A transmission device comprising:
  a first detection unit that detects, using a signal which is outputted from a display device, whether the transmission device and the display device are connected;
  a transmission unit that transmits image data to the display device;
  a second detection unit that detects whether the display device is in a first state, wherein the first state is a state where a power source of the display device is turned on and a state where image data to be transmitted from the transmission unit to the display device is selected as image data to be displayed by the display device; and
  a control unit that (a) controls, based on a detection result of the first detection unit and a detection result of the second detection unit, whether the transmission unit transmits image data to the display device, and (b) causes the transmission unit to transmit image data to the display device if the transmission device and the display device are connected and the display device is in the first state.

10. The transmission device according to claim 9, wherein the control unit causes the transmission unit not to transmit image data to the display device if the display device is changed to a second state that is different from the first state after a transmission of image data to the display device is started.

11. The transmission device according to claim 9, wherein the control unit causes the transmission unit not to transmit image data to the display device if a connection between the transmission device and the display device is disconnected after a transmission of image data to the display device is started.

12. The transmission device according to claim 9, wherein the transmission device includes at least one of a camera, a recorder, and a player.

13. A method comprising:
  detecting, using a signal which is outputted from a display device, whether a transmission device and the display device are connected;
  detecting whether the display device is in a first state, wherein the first state is a state where the display device is turned on and a state where image data to be transmitted to the display device is selected as image data to be displayed by the display device;
  controlling, based on a result of whether the transmission device and the display device are connected and a result of whether the display device is in the first state, a transmission of image data to the display device; and
  causing to transmit image data to the display device if the transmission device and the display device are connected and the display device is in the first state.

14. The method according to claim 13, further comprising causing not to transmit image data to the display device if the display device is changed to a second state that is different from the first state after a transmission of image data to the display device is started.

15. The method according to claim 13, further comprising causing not to transmit image data to the display device if a connection between the transmission device and the display device is disconnected after a transmission of image data to the display device is started.

16. A non-transitory computer readable storage medium storing a program that causes a computer to perform a method, the method comprising:
  detecting, using a signal which is outputted from a display device, whether a transmission device and the display device are connected;
  detecting whether the display device is in a first state, wherein the first state is a state where the display device is turned on and a state where image data to be transmitted to the display device is selected as image data to be displayed by the display device;
  controlling, based on a result of whether the transmission device and the display device are connected and a result of whether the display device is in the first state, a transmission of image data to the display device; and causing to transmit image data to the display device if the transmission device and the display device are connected and the display device is in the first state.

17. The method according to claim 5, wherein the transmission device includes at least one of a camera, a recorder, and a player.

18. The non-transitory computer readable storage medium according to claim 8, wherein the transmission device includes at least one of a camera, a recorder, and a player.

19. The method according to claim 13, wherein the transmission device includes at least one of a camera, a recorder, and a player.

20. The non-transitory computer readable storage medium according to claim 16, wherein the transmission device includes at least one of a camera, a recorder, and a player.

* * * * *